(12) United States Patent
Nakagawa et al.

(10) Patent No.: US 6,765,073 B2
(45) Date of Patent: Jul. 20, 2004

(54) PROCESS FOR PREPARING VINYL CHLORIDE PASTE RESIN

(75) Inventors: Tomoaki Nakagawa, Settsu (JP); Yoichi Uchida, Settsu (JP); Tsuyoshi Yoshida, Himeji (JP)

(73) Assignee: Kaneka Corporation, Osaka (JP)

( * ) Notice: Subject to any disclaimer, the term of this patent is extended or adjusted under 35 U.S.C. 154(b) by 179 days.

(21) Appl. No.: 09/897,983

(22) Filed: Jul. 5, 2001

(65) Prior Publication Data

US 2002/0019474 A1 Feb. 14, 2002

(30) Foreign Application Priority Data

Jul. 5, 2000 (JP) ........................................ 2000-204152

(51) Int. Cl.[7] ............................ C08L 27/06; C08F 2/18
(52) U.S. Cl. ......................... 526/87; 524/458; 524/567
(58) Field of Search ............................ 526/87; 524/567, 524/458

(56) References Cited

U.S. PATENT DOCUMENTS 3,980,603 A * 9/1976 Bradley et al. ............. 524/832

FOREIGN PATENT DOCUMENTS

JP     5-140205     6/1993

* cited by examiner

Primary Examiner—Kelechi C. Egwim
(74) Attorney, Agent, or Firm—Arent Fox PLLC

(57) ABSTRACT

A process for preparing a vinyl chloride paste resin comprising the steps of homogenizing a vinyl chloride monomer in an aqueous medium together with an oil-soluble polymerization initiator to form a first aqueous dispersion, and subjecting the first dispersion to a micro-suspension polymerization wherein a second aqueous dispersion containing a vinyl chloride monomer and a surface active agent is added to the reaction system in such a manner that the addition is started after starting the polymerization but by the time the polymerization conversion of the initially charged monomer reaches 30%, and is terminated by the time the polymerization conversion of the initially charged monomer reaches 95%. The process has an improved productivity since the heat removing area of a jacket of a reactor is prevented from lowering during the polymerization to increase the amount of heat removed and since the polymer yield per unit volume of the reactor is increased.

6 Claims, No Drawings

PROCESS FOR PREPARING VINYL CHLORIDE PASTE RESIN

BACKGROUND OF THE INVENTION

The present invention relates to a process for preparing vinyl chloride paste resins, and more particularly to a micro-suspension polymerization process for the production of vinyl chloride resins suitable for paste technique.

A micro-suspension polymerization process comprises a homogenizing step wherein a vinyl chloride monomer, water, a surface active agent, a polymerization initiator soluble in the monomer and other polymerization assistants are mixed in a separate apparatus from a polymerization apparatus under a high shear to form a homogeneous dispersion, and a polymerization step wherein the dispersion is transferred to the polymerization apparatus and subjected to polymerization with stirring, thereby producing fine particles of a vinyl chloride paste resin having a basic particle size of about 0.2 to about 3 μm.

The term "vinyl chloride monomer" as used herein means vinyl chloride alone or a mixture of vinyl chloride and other monomer copolymerizable with vinyl chloride.

In the micro-suspension polymerization, liquid droplets homogenized in the homogenizing step are polymerized after transferring to a polymerization apparatus and subsequently elevating the temperature to a predetermined temperature. Volumetric shrinkage of the reaction mixture occurs with the progress of the polymerization, resulting in decrease in effective area of heat removal. Thus, in addition to decrease in the heat removing capacity of the polymerization apparatus, the volumetric shrinkage causes scaling on the wall and agitating vane of the polymerization apparatus since the liquid level lowers than the cooling water passing level of a jacket to expose a part of the cooled portion.

In order to solve this problem, Japanese Patent Publication Kokai No. 5-140205 proposes a process wherein a jacket is divided to portions and cooling is conducted by passing the cooling water through the jacket so as not to expose the water passing level from the reaction liquid level, or a process wherein water, an aqueous solution of a surface active agent, a vinyl chloride monomer, or an aqueous dispersion containing vinyl chloride is additionally charged in the polymerization system in such an amount that the additional charge of the monomer is not more than 30% by weight of the initially charged monomer when the polymerization conversion of the initially charged monomer have reached not less than 40%.

However, if the water passing is stopped, when the reaction liquid level drops to the upper end of the jacket, so as not to expose the cooling water passing level of the divided jacket above the reaction liquid level, that portion of the jacket immediately loses the heat removing ability. This is unfavorable in polymerization control. Further, even if the additional charge is started at the time when the conversion has reached 40%, the liquid level has already dropped at that time to expose a part of the cooled portion. In case of adding water or an aqueous solution of a surface active agent, it increases a load in a post-treatment step, so the drying efficiency is lowered. In case of adding only the monomer, the stability of a latex is lowered.

It is an object of the present invention to provide a process of the micro-suspension polymerization of a vinyl chloride monomer which is improved in polymerization productivity by preventing the heat removal area of a jacket from decreasing during the polymerization, thereby preventing the heat removal capacity of the jacket from lowering and simultaneously increasing the yield of produced polymer per unit volume of a polymerization vessel.

This and other objects of the present invention will become apparent from the description hereinafter.

SUMMARY OF THE INVENTION

The present inventors paid attention to the volumetric shrinkage of a latex which occurred during the polymerization and made an intensive study on a relationship of the conditions for additionally charging a dispersion of a monomer during the polymerization, a change of the liquid level of the reaction mixture in a reactor and the heat removing capacity of a jacket of the reactor, and they have reached the present invention.

In accordance with the present invention, there is provided a process for preparing a vinyl chloride paste resin which comprises the steps of homogenizing a vinyl chloride monomer in an aqueous medium together with an oil-soluble polymerization initiator to form a first aqueous dispersion, subjecting the first dispersion to a micro-suspension polymerization and additionally charging a second aqueous dispersion containing a vinyl chloride monomer and a surface active agent to the reaction system, wherein the additional charging is carried out in such a manner that the additional charging is started after starting the polymerization but on or before the time the polymerization pump of one or two stage pressurization type, a colloid mill, a centrifugal pump, a homogenizer, an agitator of vibration type, high pressure injection through a nozzle or an orifice, and ultrasonic wave.

If the concentration of the vinyl chloride monomer in the additionally charged dispersion is too low, the solid concentration of a latex obtained by the polymerization is low and, therefore, the load in the drying step to obtain the polymer powder from the latex increases. If the monomer concentration is too high, the stability of the additionally charged dispersion lowers and, therefore, phase separation may occur before the dispersion is introduced into the polymerization reactor, thus resulting in lowering of the stability of the reaction mixture since the monomer is introduced thereto in the form of large droplets. In light of the above, preferably the concentration of the monomer in the aqueous dispersion to be additionally charged is from 25 to 70% by weight, especially from 45 to 60% by weight.

The kind of the surface active agent to be included in the additionally charged dispersion is not particularly limited. The surface active agent may be the same as or different from that included in the reaction mixture, namely the surface active agent used in the initially charged dispersion. The amount of the surface active agent in the additionally charged dispersion is not particularly limited, but is usually from 0.1 to 3 parts by weight per 100 parts by weight of the monomer included in the additionally charged dispersion.

If the time of starting the addition of the second dispersion to the polymerization system is too late, the heat removing area of the jacket has already been decreased at that time. If the cooling water passing to the jacket is stopped in order to prevent scaling, the principle conversion of the initially charged monomer reaches 30% and the additional charging is terminated on or before the time the polymerization conversion of the initially charged monomer reaches 95%.

As the vinyl chloride monomer is used vinyl chloride alone or a mixture of vinyl chloride and other monomer copolymerizable therewith.

Preferably, the monomer concentration of the additionally charged second dispersion is from 25 to 70% by weight and the amount of the additionally charged monomer is from 3 to 30 parts by weight per 100 parts by weight of the monomer initially charged.

According to the present invention, exposure of a jacket of a polymerization apparatus due to volumetric shrinkage of the reaction mixture is prevented by adding a dispersion prepared from a vinyl chloride monomer and an aqueous solution of a surface active agent to a polymerization reactor during the polymerization reaction, thereby effectively utilizing the jacket during the polymerization. In addition, the productivity can be improved by causing the produced polymer particles to absorb the additionally charged monomer and converting it into a polymer, thereby increasing the yield of the polymer per unit volume of the reactor.

DETAILED DESCRIPTION

The second dispersion to be additionally charged can be obtained by previously mixing a vinyl chloride monomer and an aqueous solution of a surface active agent to form an aqueous dispersion in a pressure vessel in a known manner using, for example, a high pressure heat removing area cannot be preserved. In light of these, the addition of the second dispersion is started within the period that the polymerization conversion of the initially charged monomer is not more than 30% after starting the polymerization, preferably not more than 20%, more preferably not more than 10%.

If the time of terminating the addition of the second dispersion is too late, the polymerization time is prolonged and the polymerization productivity may be rather lowered. Thus, the addition of the second dispersion is terminated within the period that the polymerization conversion of the initially charged monomer is not more than 95%, preferably not more than 90%, in other words, the amount of the polymer produced is not more than 95% by weight, preferably not more than 90% by weight, based on the initially charged monomer.

The second dispersion is added to the polymerization system for the purpose of keeping the liquid level of the reaction mixture in the reactor so as to prevent the cooled portion of the reactor from being exposed. Accordingly, the second dispersion should be gradually added over a period of time. Preferably, the addition of the second dispersion is terminated after the polymerization conversion of the initially charged monomer reaches 70%, especially 75%, more especially 80%.

If the additional charge of the vinyl chloride monomer is too small, the increase of the polymer produced is small and the improvement in the productivity is not expected. If the additional charge of the monomer is too large, the polymerization time is prolonged and the polymerization productivity rather tends to lower. The amount of the vinyl chloride monomer in the additionally charged second dispersion is from 3 to 30 parts by weight, preferably from 5 to 20 parts by weight, based on 100 parts by weight of the initially charged vinyl chloride monomer.

The second dispersion may be continuously or intermittently added to the polymerization system. If the liquid level in the polymerization reactor rises during the polymerization by the addition of the second dispersion to a level higher than the initial liquid level at the time of starting the polymerization, the inner pressure rises to invite danger. Therefore, it is preferable to add the second dispersion so that the liquid level does not rise over the initial level at the time of starting the polymerization. The liquid level during the polymerization can be easily calculated from the initial charge of the raw materials and the polymerization conversion. Also, it is possible to know the conversion by sampling the reaction mixture during the polymerization followed by calculation according to a weight method, or by calculating from the amount of heat removed from the jacket.

The monomers used in the process of the present invention are vinyl chloride alone and a mixture of vinyl chloride and other monomers copolymerizable therewith. These monomers are herein referred to as "vinyl chloride monomer".

The other monomers copolymerizable with vinyl chloride are not particularly limited, and all known monomers copolymerizable with vinyl chloride can be used. Examples of the other copolymerizable monomers are, for instant, an olefin such as ethylene, propylene or butene, a vinyl ester such as vinyl acetate, vinyl propionate or vinyl stearate, a vinyl ether such as methyl vinyl ether, ethyl vinyl ether, octyl vinyl ether or lauryl vinyl ether, a vinylidene compound such as vinylidene chloride, an unsaturated carboxylic acid and an acid anhydride thereof such as acrylic acid, methacrylic acid, fumaric acid, maleic acid, itaconic acid, maleic anhydride or itaconic anhydride, an unsaturated carboxylic acid ester such as methyl acrylate, ethyl acrylate, monomethyl maleate, dimethyl maleate or butylbenzyl maleate, an aromatic vinyl compound such as styrene, α-methylstyrene or divinyl benzene, an unsaturated nitrile compound such as acrylonitrile, a crosslinking monomer such as diallyl phthalate, and other vinyl monomers. These monomers may be used alone or in admixture thereof. It is preferable that the amount of the other copolymerizable monomers is less than 50% by weight based on the mixture with vinyl chloride.

The surface active agent used in the micro-suspension polymerization is not particularly limited. In general, an anionic surface active agent is used in an amount of 0.1 to 3 parts by weight per 100 parts by weight of the monomer. Examples of the surface active agent are, for instance, potassium, sodium and ammonium salts of fatty acids, alkyl sulfates, alkylbenzenesulfonates, alkyl sulfosuccinates, α-olefin sulfonates and alkyl ether phosphates, and the like.

A higher alcohol or higher fatty acid can be used as a dispersing assistant, e.g., a high alcohol such as lauryl alcohol, myristyl alcohol, cetyl alcohol or stearyl alcohol, and a higher fatty acid such as lauric acid, myristic acid, palmitic acid or stearic acid. Other polymerization assistants which can be used in the present invention include, for instance, an aromatic hydrocarbon, a dispersing stabilizer such as polyvinyl alcohol or gelatin, an agent for adjusting the particle size such as sodium sulfate or sodium bicarbonate, a chain transfer agent, antioxidant, and the like. These may be used alone or in admixture thereof.

Examples of the oil-soluble polymerization initiator used in the micro-suspension polymerization are, for instance, organic peroxide compounds, e.g., a diacyl peroxide such as dilauroyl peroxide or di-3,5,5-trimethylhexanoyl peroxide, a peroxydicarbonate such as diisopropyl peroxydicarbonate or di-2-ethylhexyl peroxydicarbonate, and a peroxyester such as t-butyl peroxypivalate or t-butyl peroxyneodecanoate; and an azo compound such as 2,2'-azobisisobutyronitrile, 2,2'-azobis(2,4-dimethylvaleronitrile) or 2,2'-azobis(4-methoxy-2,4-dimethylvaleronitrile). The amount of the initiator is generally from about 0.01 to about 3 parts by weight based on the total charge of the monomer. In order to prevent extension of the polymerization time owing to addition of the monomer, it is possible to increase the initial charge of the initiator or to add the initiator in the course of the polymerization.

The homogenization to prepare an aqueous dispersion to be subjected to micro-suspension polymerization can be carried out in a known manner using, for example, a high pressure pump of one or two stage pressurization type, a colloid mill, a centrifugal pump, a homogenizer, a vibration type agitator, high pressure injection through a nozzle or an orifice, and ultrasonic wave.

Usual polymerization conditions are applicable to the process of the present invention. For example, the polymerization temperature is from 30 to 75° C. The amount of water used in the polymerization is from 0.6 to 3 times the weight of the whole monomer. The kinds and amounts of the dispersing assistants and the polymerization assistants can be suitably determined in accordance with desires. In order to prevent scaling, it is desirable to previously coat an anti-scaling agent on the inner surface of the wall of the polymerization vessel, or to conduct pressurization with nitrogen gas prior to elevating the temperature of the first dispersion.

According to the present invention, the productivity can be remarkably improved, since the effective area of the jacket during the polymerization is increased to enhance the heat removing capacity and since the yield of the polymer per unit volume of the polymerization reactor is increased.

The present invention is more specifically described and explained by means of the following Examples.

EXAMPLE 1

A 300 liter pressure vessel was charged with 110 kg of vinyl chloride, 110 kg of ionized water, 0.77 kg of sodium dodecylbenzenesulfonate and 1.1 kg of cetyl alcohol, and they were homogenized by a pressure homogenizer. The resulting aqueous dispersion was transferred to a 300 liter polymerization reactor containing 100 g of 2,2'-azobis-2,4-dimethylvaleronitrile. The temperature was elevated to 45° C. to initiate the polymerization.

Separately, a 80 liter pressure vessel was charged with 35 kg of a 1% by weight aqueous solution of sodium dodecylbenzenesulfonate. After degassing, 40 kg of vinyl chloride was added to the vessel and dispersed for 30 minutes by a homogenizer to give a second dispersion for additional charging.

When 3 hours had elapsed since the inner temperature of the reactor reached 45° C., continuous addition of the second dispersion to the reactor was started at a rate of 6.0 kg/hour (3.2 kg of monomer per hour). When 8 hours had lapsed, the continuous addition was terminated. The total amount of the second dispersion added was 30.0 kg, the monomer part of which was 16.0 kg. The polymerization conversion at the time of starting the addition of second dispersion was 25% based on the monomer initially charged, and the polymerization conversion at the time of terminating the addition was 83%.

The polymerization was further continued until the polymerization pressure dropped by 1.5 kg/cm$^2$ from the initial pressure (6.0 kg/cm$^2$), and the residual monomer was removed and recovered from the obtained latex. The polymerization conversion of the obtained latex was 94% based on the total weight of the monomer initially charged and the monomer additionally charged (the total of the initially charged monomer and the additionally charged monomer being hereinafter referred to as "whole monomer").

A scale was filtered off through a 32 mesh standard sieve from the latex, dried and weighed. The latex was spray-dried in a usual manner and the obtained powder was pulverized by a bantam mill to give a paste resin. To 100 parts by weight of the paste resin was added 65 parts by weight of di-2-ethylhexyl phthalate plasticizer, and they were kneaded with defoaming by an Ishikawa mixer to form a plastisol. After allowing to stand at 30° C. for 1 hour, the viscosity of the plastisol was measured by a Brookfield M-type viscometer (rotor # 3.6 rpm).

The results are shown in Table 1.

EXAMPLE 2

The procedure of Example 1 was repeated except that when 2 hours had elapsed since the inner temperature of the reactor reached 45° C., continuous addition of the second dispersion was started at a rate of 5.1 kg/hour (2.7 kg of monomer per hour). The total amount of the second dispersion added was 30.6 kg, the monomer part of which was 16.3 kg. The polymerization conversion of the initially charged monomer was 15% at the time of starting the addition of second dispersion and was 87% at the time of terminating the addition. With respect to the finally obtained latex, the conversion of the whole monomer was 93%. The results are shown in Table 1.

EXAMPLE 3

The procedure of Example 1 was repeated except that when 1 hour had elapsed since the inner temperature of the reactor reached 45° C., continuous addition of the second dispersion was started at a rate of 5.1 kg/hour (2.7 kg of monomer per hour). The total amount of the second dispersion added was 35.7 kg, the monomer part of which was 19.0 kg. The polymerization conversion of the initially charged monomer was 8% at the time of starting the addition of second dispersion and was 89% at the time of terminating the addition. With respect to the finally obtained latex, the conversion of the whole monomer was 94%. The results are shown in Table 1.

COMPARATIVE EXAMPLE 1

The procedure of Example 1 was repeated except that continuous addition of the second dispersion was not conducted. With respect to the finally obtained latex, the conversion of the whole monomer was 93%. The results are shown in Table 1.

COMPARATIVE EXAMPLE 2

The procedure of Example 1 was repeated except that continuous addition of the second dispersion was started when 5 hours had elapsed since the inner temperature of the reactor reached 45° C. and was terminated when 10 hours had elapsed. The total amount of the second dispersion added was 30.0 kg, the monomer part of which was 16.0 kg. The polymerization conversion of the initially charged monomer was 40% at the time of starting the addition of second dispersion and was 98% at the time of terminating the addition. With respect to the finally obtained latex, the conversion of the whole monomer was 91%. The results are shown in Table 1.

COMPARATIVE EXAMPLE 3

The procedure of Example 1 was repeated except that instead of the second dispersion, vinyl chloride was sprayed into the reaction mixture for 10 minutes at a rate of 36.1 kg/hour through a nozzle 1 hour, 2.5 hours, 4 hours and 5.5 hours after the inner temperature of the reactor reached 45°

C. The total amount of the vinyl chloride added was 24.1 kg. With respect to the finally obtained latex, the conversion of the whole monomer was 87%. The results are shown in Table 1.

TABLE 1

|  | Ex. 1 | Ex. 2 | Ex. 3 | Com. Ex. 1 | Com. Ex. 2 | Com. Ex. 3 |
| --- | --- | --- | --- | --- | --- | --- |
| Conversion of the whole monomer (%) | 95 | 93 | 94 | 93 | 91 | 87 |
| Polymerization time (hour) | 9.5 | 9.4 | 9.3 | 9.3 | 11.3 | 9.8 |
| Proportion of coarse particles in the obtained latex (% by weight) | 0.12 | 0.13 | 0.09 | 0.13 | 0.17 | not measurable *1 |
| Heat removal state of jacket in the final stage of polymerization | good | good | good | full cooling | good | full cooling, rise of inner temp. |
| Viscosity of plastisol measured after allowing to stand for 1 hour | 2,100 | 2,020 | 2,080 | 2,320 | 2,180 | — |

Note:
*1 Latex was coagulated.

What we claim is:

1. A process for preparing vinyl chloride paste resin which comprises the steps of homogenizing a vinyl chloride monomer in an aqueous medium together with an oil-soluble polymerization initiator to form a first aqueous dispersion, subjecting said first dispersion to a micro-suspension polymerization and additionally charging a second aqueous dispersion containing a vinyl chloride monomer and a surface active agent to the reaction system, wherein the additional charging is carried out in such a manner that the additional charging is started after starting the polymerization but on or before the time the polymerization conversion of the initially charged monomer reaches 30% and the additional charging is terminated on or before the time the polymerization conversion of the initially charged monomer reaches 95%.

2. The process of claim 1, wherein the concentration of the monomer in said second dispersion additionally charged is from 25 to 70% by weight.

3. The process of claim 1, wherein the amount of the monomer in said second dispersion additionally charged is from 3 to 30 parts by weight per 100 parts by weight of the monomer initially charged.

4. The process of claim 1, wherein said vinyl chloride monomer is vinyl chloride only.

5. The process of claim 1, wherein said vinyl chloride monomer is a mixture of vinyl chloride and less than 50% by weight of other monomer copolymerizable therewith.

6. The process of claim 5, wherein said other monomer is at least one member selected from the group consisting of olefins, vinyl esters, vinyl ethers, vinylidene compounds, unsaturated carboxylic acids or their anhydrides, unsaturated carboxylic acids or their anhydrides, unsaturated carboxylic acid esters, aromatic vinyl compounds, unsaturated nitrile compounds, and crosslinking monomers.

* * * * *